No. 751,773. PATENTED FEB. 9, 1904.
B. F. BAKER.
HARNESS.
APPLICATION FILED MAR. 27, 1901.
NO MODEL.
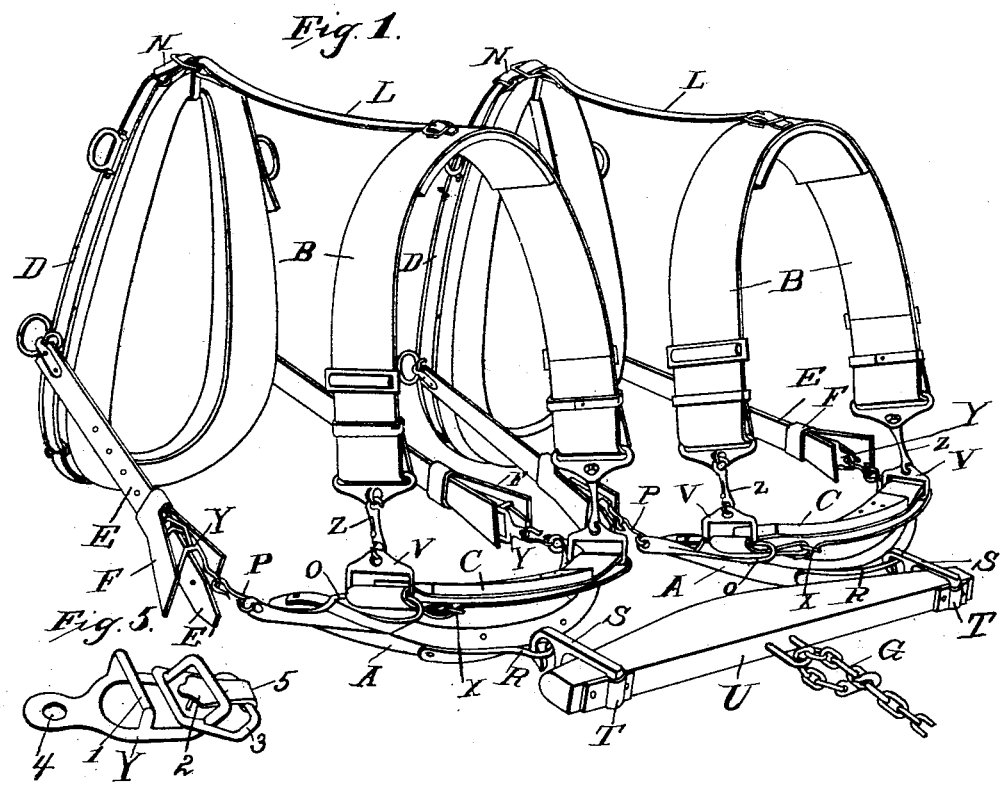
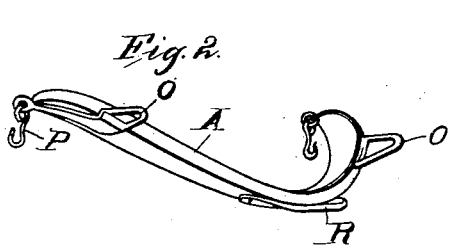
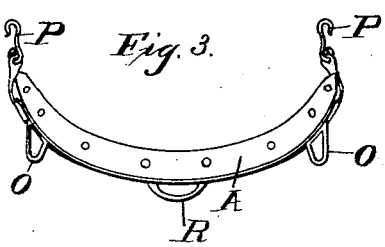
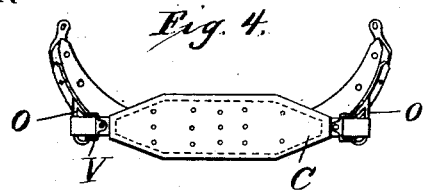
Witnesses
R. H. Storm.
J. H. Newman.
Inventor
Benjamin F. Baker
By
E. E. Masson
Attorney No. 751,773. Patented February 9, 1904.

UNITED STATES PATENT OFFICE.

BENJAMIN F. BAKER, OF BURNTHILLS, NEW YORK.

HARNESS.

SPECIFICATION forming part of Letters Patent No. 751,773, dated February 9, 1904.

Application filed March 27, 1901. Serial No. 53,086. (No model.)

*To all whom it may concern:*

Be it known that I, BENJAMIN F. BAKER, a citizen of the United States, residing at Burnthills, in the county of Saratoga and State of New York, have invented certain new and useful Improvements in Harness, of which the following is a specification.

My invention relates to that class of harness which dispenses with the use of the ordinary long traces connecting with whiffletrees in the rear of the team; and my improvements have for their object to better adapt this class of apparatus to the uses for which it is designed by making it lighter, stronger, cooler, and more comfortable for the team, by eliminating all downdraft either on the back or neck, and by giving independence of motion to each animal and in every direction without disturbing the perfect balance of the harness, the angle of draft on the collar, or the even distribution of the draft strain on each shoulder of the animal.

My invention also gives to the team greater power both in the direct or forward draft and when attached to the pole in backing or holding back the load.

It also enables the cultivator when working among vines or fruit-trees to do closer work than is possible even with one horse in the ordinary harness, while positively preventing any injury to the vines or fruit-trees either by the projecting ends of the whiffletrees, as in the ordinary harness, or by the equally objectionable projecting ends of the vertically-suspended steel bows commonly used in other harness of this class.

I am also enabled in my device by its simplicity of construction and the use of free joints throughout to make the draft direct and to obviate all twist or leverage on any part of the harness, and especially at the point of connection between the bow and evener or draft-bar, a defect inherent in all practicable forms of traceless harness heretofore used.

A further advantage of my improved harness is that it may be put on as easily as the ordinary harness and upon each animal separately and in the stall, if desired. The position of the evener, being under the pole when used in that connection, tends to lift the weight of the pole and neck-yoke off the necks of the team when the draft strain is applied, thereby obviating the use of the spiral or flat springs frequently attached to the pole to accomplish this result.

I attain these objects by the mechanism illustrated in the accompanying drawings, in which—

Figure 1 is a perspective view of a harness made in accordance with my invention with evener or draft-bar and draft-chain applied. Fig. 2 is a perspective view of the detached bow. Fig. 3 is a top view of the same. Fig. 4 is a top plan view of the bow with the belly-band applied, and Fig. 5 is a perspective view of the combined buckle and cockeye which forms the connection between the bow end hook and the tug.

Similar characters denote like parts throughout the several views.

The harness, as shown in perspective in Fig. 1, consists of two wood or metal bows A, having their ends bent upwardly and forwardly on a compound curve and arranged to be suspended at all times in a horizontal position back of the fore legs of the horse by means of the back-bands B, passing over the backs of the horses and having their depending ends provided with sliding buckles and snaps Z, which engage the loops V. The latter are provided with elongated openings through which the belly-bands C pass and are connected with outriggers O, as shown in Figs. 1 and 4. The belly-bands C are adjusted as to length by a billet and buckle X, Fig. 1.

The bows A are attached at their ends by means of the loops and hooks P, Figs. 1 and 2, and the combined buckles and cockeyes Y, Figs. 1 and 5, to the tugs E, which are attached to the hames D, as in the ordinary harness. The back-straps L connect the top hame-straps N with the back-bands B. The draft-bar U, which in this instance also constitutes the evener, is connected, by means of the swinging hooks S and the elongated loop R, with the bows A.

In a forward movement of the team the draft strain is communicated from the hames D to the tugs E and by the connecting devices Y and P to the bows A and thence by the loops R to the swinging hooks S, to the evener U, and by the central evener-clevis and draft-chain G to the load.

As already stated, the bows A, which may be constructed either of wood or metal or of wood and metal combined, are of the peculiar form shown in perspective in Fig. 2. They combine a horizontal curve at the center of the bow with a forward and slightly-upward curve toward the end of the same, but are modified by the gradually-increasing twist from the center to the end of the bow in such a manner as to throw the outer edge of the bow gradually upward and inward toward the ends. This peculiar form follows as nearly as possible the contour lines of the horse's body at the point back of the fore legs where the bows are suspended when in use. The bows are provided at their ends with loops and hooks P and with rearwardly-projecting outriggers O. These outriggers on their upper side are parallel with each other and with the plane of the flat surface of the bow at the center. The bow is further provided with an elongated rearwardly-extending oval loop R, and this and all the other metal attachments above described are placed upon the under or partly-convex side of the bow, leaving an absolutely smooth surface upon the inner or top portion of the same. The outriggers O are calculated to receive the belly-bands C, which pass over and through the openings in the same and are adjusted by means of the billet and buckle X, Fig. 1. The sliding loops V play freely upon the belly-band C and engage the snap Z in connection with the back-band B in such a manner as to permit the bow to be suspended in a horizontal position under the horse with the front ends projecting slightly upwardly and also to permit the back-bands to adjust themselves to animals of different size.

The functions of the bow are to communicate the draft strain received from the evener or draft-bar U by means of the swinging hooks S and the elongated loops R to the tugs E and to act as a stretcher to prevent the tugs from hugging too closely the shoulders of the horse. In performing these functions the peculiar conformation of the bow is such that its relative position remains the same, always presenting the smooth flat surface to the belly and sides of the horse and by its compound upward and forward curve preventing the bow and evener ever coming in contact.

The back-bands B, Fig. 1, may be made of webbing, canvas, or other suitable material and are provided at their depending ends with sliding buckles to adapt them to animals of different sizes and connecting, by means of the snaps Z, with the sliding loops V, Figs. 1 and 4. The loops V connect with the belly-bands C, which are in turn connected with the bows A by means of the rearwardly-projecting outriggers O. The back-straps L, Fig. 1, have a loop in their forward ends which passes over the hame-straps N and are at their other ends connected, by means of a billet and buckle, with the back-bands B. The back-straps L are to hold the collars and back-bands always in their proper positions.

The tugs are made of such length that their rearwardly-projecting ends E' pass beyond the hooks and loops P, attached to the ends of the bows A, forming a shield to prevent these points from touching vines or trees in passing. The tugs are provided with adjustable combined buckles and cockeyes Y, (shown detached in Fig. 5,) which engage the hooks P and are in turn covered by the sliding leather guards F, Fig. 1, intended also to prevent damage to vines and trees. By use of the seadjustable buckles and cockeyes Y the tugs E may be fitted to teams of any size, and by lengthening or shortening the tugs the position of the bow may be altered so as to adapt it to any required angle of draft. The peculiar construction of the combined buckle and cockeye is shown in perspective in Fig. 5. The trace passes under and through the buckle 3 and the loop 1, the buckle-tongue 2 dropping into one of the holes punched in the trace. The draft being then applied to the hook P, engaging the opening 4 in the cockeye, draws the rear part downward onto the buckle-tongue plate 5, holding it securely until released by hand.

The belly-band C is illustrated in Figs. 1 and 4. The wider or central portion of the belly-band is provided on its upper surface with a covering of felt, the felt and leather being preferably perforated at short distances to admit air to the body of the horse. The belly-band C is also provided with sliding loops V, which play freely on the belly-band at either end between the supporting outriggers O and the wider or central portion of the band.

Fig. 4 especially illustrates the position which the belly-band occupies when attached to the rearwardly-projecting outriggers O. The outriggers are carried back far enough to throw the center of the band-back of the center of the bow A opposite the point of connection of the bow A and the swinging hooks S. This position has two important advantages: First, the wider portion of the belly-band extends over and covers the connection of the loop R with the swinging hook S, thereby preventing any accidental contact of the swinging hook S with the belly of the animal; secondly, the center of the belly-band being back of the center of the bow said belly-band is not intended to be stretched tight across the bow, but is calculated to hang loosely without touching the bow at any point. It is obvious that the belly-band may be constructed of a variety of equivalent forms.

The functions of the belly-band, as illustrated in Figs. 1 and 4, are threefold: First, it relieves the shoulder or breast of the animal of part of the draft strain whenever the direct line of draft from the hame to the load is above the point of connection between the evener and bow, thus preventing the choking of the animal by an upward pressure of the collar; second, by hanging loosely between the outriggers O it gives freedom of movement to the body of the animal independently of the position of the bow; third, by acting in combination with the back-bands, sliding loops, and bow it increases the resisting power of the team by tightening about the body of the horse in holding back when used with a pole and martingale.

The connecting evener or draw-bar U is shown in its proper relation in Fig. 1. It is preferably constructed of hardwood, tapering on one side from the center to the ends. The straight side is placed at the rear and the arched side to the front, this form of construction adding very greatly to its strength.

The swinging hooks S are made to pass around the evener at a suitable distance from the ends of the same. The rectangular openings in said hooks are large enough to permit of their playing freely on the evener from side to side. These hooks are held in position by the loops T, Fig. 1.

The free-jointed connection of the evener U with the bows A by means of the swinging hooks S and the elongated loops R gives ample side motion to the team in working. The construction of the entire apparatus is such that one animal may be above or below, ahead or behind, the other without in any way disturbing the even draft on the shoulder, and the combination of the upward and vertical curve at the ends with the rearward and horizontal curve of the bow makes it impossible to bring the bow and evener into contact when in operation.

The operation of my invention will be readily understood from the full and detailed description of it herein given, and it will be seen that while its general use would be on double teams that it may be separated into two single harnesses and used in that way by dispensing with the evener and attaching traces to the bow. It may also be used with breast-collars as with hame-collars, if desired.

It will be obvious to those skilled in the art to which the invention relates that modifications may be made in details without departing from the spirit and scope of the invention. Hence I do not limit myself to the precise construction and arrangement of parts hereinabove described and illustrated in the accompanying drawings; but, Having described the nature and objects of the invention, what is claimed as new, and desired to be secured by Letters Patent, is—

1. In a double harness, the combination with the back-band and tugs, of a bow curved forwardly and slightly upwardly, connections for suspending the bow from the back-band in balanced relation, and a belly-band interposed between the bow and back-band and maintained out of contact with the bow, substantially as described.

2. In a double harness, the combination with the back-band and tugs, of a bow curved forwardly and slightly upwardly, connections for suspending the bow from the back-band in balanced relation, said connections including outriggers attached to said bow and a belly-band carried by the outriggers and having free-jointed connection with the back-band, substantially as described.

3. In a double harness, the combination with the back-band and tugs, of a bow curved forwardly and slightly upwardly, and connections for suspending the bow from the back-band and comprising a belly-band having sliding connection with the back-band, and outriggers attached to said bow provided with loops to accommodate the belly-band, substantially as described.

4. In a double harness, the combination with a bow having its ends bent forwardly and slightly upwardly, of a back-band for suspending the bow, and a belly-band interposed between the bow and back-band and maintained out of contact with the bow, substantially as described.

5. In a double harness, the combination with a bow having its ends bent forwardly and slightly upwardly and provided with rearwardly-extending outriggers, a belly-band carried by said outriggers, the back-band, and loops having free-jointed connection with the back-band and arranged for sliding engagement with the belly-band, substantially as described.

6. In a double harness, a bow having its ends bent forwardly and upwardly, said bow provided centrally at its rear with a loop to receive the evener, and at its ends with outriggers served forward with hooks to receive the tugs and rearward with loops to receive the belly-band and a belly-band supported by the last-named loops, substantially as described.

7. The combination with the upwardly and forwardly curved bows, of an evener connected to each of the bows midway of their ends, the outriggers projecting rearwardly of the bows at opposite ends thereof, the belly-bands carried by the outriggers, the back-bands provided at their ends with loops having sliding engagement with the belly-bands, hames, tugs connecting the hames with the forward ends of the bows, and back-straps connecting the hames with the back-bands, substantially as described.

In testimony whereof I have hereunto set my hand, in the presence of two witnesses, this 23d day of March, 1901.

BENJAMIN F. BAKER.

Witnesses:
 ASHLEY B. BAKER,
 G. C. HOLLISTER.